United States Patent
Baba et al.

(10) Patent No.: US 8,304,007 B2
(45) Date of Patent: Nov. 6, 2012

(54) METHOD FOR PREPARING SYRUP FROM RED SHISO

(75) Inventors: Kenji Baba, Hiroshima (JP); Takeshi Ishikawa, Hiroshima (JP); Tsuneo Takei, Aki-gun (JP)

(73) Assignee: Mishima Foods Co., Ltd., Hiroshima-shi (JP)

( * ) Notice: Subject to any disclaimer, the term of this patent is extended or adjusted under 35 U.S.C. 154(b) by 318 days.

(21) Appl. No.: 12/529,724

(22) PCT Filed: Jan. 23, 2008

(86) PCT No.: PCT/JP2008/050878
§ 371 (c)(1),
(2), (4) Date: Sep. 3, 2009

(87) PCT Pub. No.: WO2009/093312
PCT Pub. Date: Jul. 30, 2009

(65) Prior Publication Data
US 2010/0119673 A1 May 13, 2010

(51) Int. Cl.
*A23L 1/27* (2006.01)
(52) U.S. Cl. ............ 426/431; 426/435
(58) Field of Classification Search .......... 426/431, 426/435
See application file for complete search history.

(56) References Cited

U.S. PATENT DOCUMENTS

| | | | |
|---|---|---|---|
| 2,790,720 A * | 4/1957 | Novak | 426/310 |
| 5,407,696 A * | 4/1995 | Hagiwara et al. | 426/636 |
| 5,482,727 A * | 1/1996 | LaBorde et al. | 426/270 |
| 6,022,573 A * | 2/2000 | Hagiwara | 426/270 |
| 7,981,449 B2 * | 7/2011 | Sugiyama et al. | 424/729 |

FOREIGN PATENT DOCUMENTS

| | | |
|---|---|---|
| JP | 63 17678 | 1/1988 |
| JP | 63-222668 | 9/1988 |
| JP | 2 97370 | 4/1990 |
| JP | 2 163065 | 6/1990 |
| JP | 4 40879 | 2/1992 |
| JP | 6 169752 | 6/1994 |
| JP | 11-75790 | 3/1999 |
| JP | 2003 265149 | 9/2003 |
| JP | 2006 4 | 1/2006 |

OTHER PUBLICATIONS

English Translation for 2003-265149. published Sep. 2003.*
Kumi Yoshida, et al., "Stabilization and Color Variation of Anthocyanins with Inorganic Salts", Seventh Symposium on Salt, vol. 2, XP009015528, Jan. 1, 1993, pp. 623-630.
Taiwanese Office Action issued Oct. 24, 2011, in Patent Application No. 098122384.
http://tw.myblog.yahoo.com/suyishin/article?mid=-2&next=480&1=f&fid=23, Oct. 24, 2006, (with Abstract).
http://books.google.com.tw/books?id=LF6-jvvwDm0C&printsec=frontcover#v=onepage&q&f=false, 2006, (with Abstract).
http://www.fengshui-chinese.com/discuz/archiver/?tid-39257.html, May 6, 2006, (with Abstract).

* cited by examiner

*Primary Examiner* — Anthony Weier
(74) *Attorney, Agent, or Firm* — Oblon, Spivak, McClelland, Maier & Neustadt, L.L.P.

(57) ABSTRACT

Provided is a syrup extracted from red shiso and having a clear red color. The method of obtaining this involves: (1) draining water after blanching raw red shiso; (2) extracting, with water, the blanched red shiso while applying heat; and (3) adding an acid to the extract of the red shiso.

20 Claims, No Drawings

METHOD FOR PREPARING SYRUP FROM RED SHISO

CROSS REFERENCE TO RELATED APPLICATIONS

The present application is the national stage of international application PCT/JP2008/050878, filed on Jan. 23, 2008.

TECHNICAL FIELD

The present invention relates to a method for preparing syrup having a clear red color and extracted from red Shiso or perilla or Beefsteak plant (*Perilla Frutescens*) (hereinafter referred to as simply "red shiso").

BACKGROUND ART

Syrup having a red color has widely been used for the coloration of ice cream and for imparting a color and taste to, for instance, a variety of cocktails.

It has not conventionally been known to extract syrup having a red color from the red shiso and to use the same in such applications.

The inventors of this invention have found that syrup having a clear red color can be obtained by using red shiso as a raw material, and by extracting the red shiso while applying heat thereto and subsequently by treating the resulting extract with an acid. In particular, it has been unexpectedly found that when the red shiso is heat-treated, in advance, using salt water (the blanching treatment), the reddish tinge of the resulting syrup may be improved.

The syrup obtained from the naturally occurring food materials such as red shiso, by nature, does not adversely affect the human bodies and more specifically it is quite safe for the human body, as compared with synthesized ones.

DISCLOSURE OF THE INVENTION

Problems that the Invention is to Solve

Accordingly, it is an object of the present invention to provide a method for preparing syrup extracted from red shiso (red *Perilla frutescens* Britton var. *crispa* Deane or the like) having a clear red color.

Means for the Solution of the Problems

According to the present invention, there is thus provided a method for preparing syrup of red shiso comprising the steps of:
(1) draining water after blanching raw red shiso;
(2) extracting the blanched red shiso with water, while applying heat to it; and
(3) adding an acid to the extract of the red shiso.

BEST MODE FOR CARRYING OUT THE INVENTION

The present invention will now be described in more detail below.

Various kinds of red shisos can be used in the present invention as raw materials. Examples of such raw red shisos suitably used herein include red shisos which have long been cultivated and red shiso OHBA. In particular, leaves of red shiso (the name of species: HOKO) are excellent in the development of a red color and can provide syrup of a deep red color. On the other hand, the red shiso OHBA (the name of species: AKAMARU OHBA) is excellent in the fragrancy and can provide good fragrance peculiar to the same. Moreover, the color tone and the fragrance of the resulting syrup can be adjusted by appropriately combining syrup products originated from various kinds of these red shisos.

As such raw red shisos, parts of the plants such as the leaves and stems thereof may be used, but it is in general suitable to use the leaves thereof. In the following description, the present invention will be described while taking the leaves of red shiso by way of example, but the description would likewise be applicable to other parts of the red shisos.

The leaves of the red shiso are preferably those as fresh as possible and, in particular, those immediately after the gathering since they may provide syrup having a deep red color.

It is suitable that the leaves of the red shiso are preferably subjected to, in advance, the steps of, for instance, selection and washing prior to the practical use thereof in the method according to the present invention.

According to the present invention, the leaves of the red shiso are then subjected to a blanching treatment. Thus, syrup having a deeper red color can be prepared unlike the syrup prepared through the extraction free of any blanching treatment.

The blanching treatment can be carried out by, for instance, heating the leaves of the red shiso while immersing the leaves in salt water.

The salt water preferably has a salt concentration ranging from 1% to 15% and preferably about 2 to about 7%. In this respect, if the salt concentration increases, the taste of the red shiso is liable to be reduced, but the redness of the resulting syrup is never impaired. Accordingly, syrup having deep red color can be obtained even if the salt water used has a salt concentration of not less than 10%.

It is particularly preferred that the blanching treatment is carried out while the leaves of the red shiso are completely dipped in a brine or salt water. The amount of salt water is in general so adjusted that the ratio, by mass, of the leaves of the red shiso (the mass thereof weighed after drying (hereunder referred to as "dry mass")) to the salt water used is on the order of 1:2 to 1:10 and preferably 1:3 to 1:9 as expressed in terms of (the dry mass of the leaves of the red shiso)/(the mass of the salt water). In this respect, if the amount of the salt water is too small, the resulting syrup may often be of a residual bitter taste.

The leaves of the red shiso are subjected to a blanching treatment at a temperature, for instance, ranging from 60 to 100° C. (if the temperature exceeds 100° C., a pressure should be applied) and preferably and, in particular, when making the blanching treatment more simple, 70 to 100° C., for instance, 90 to 100° C. If the temperature of the blanching treatment is too low, the resulting syrup may often have a residual bitter taste. In this respect, however, the use of the temperature of the blanching treatment of not less than 90° C. would never adversely affect the redness of the resulting syrup and the resulting syrup has a deep red color.

The time required for the blanching treatment is greatly influenced by the temperature used in the blanching treatment, but it suitably ranges, for instance, from about 10 seconds to about 2 minutes and preferably on the order of 20 to 50 seconds.

The red shiso subjected to the blanching treatment is then subjected to a water-drainage treatment and it is subsequently extracted with water. The water-drainage treatment may be carried out according to any means currently adopted by one of ordinary skill in the art. For instance, as a familiar means, the water remaining on the leaves of the red shiso after the blanching treatment can efficiently be reduced or removed by placing them in a (bamboo) basket and allowing them to stand while, if necessary, they are simply, quickly and finely vibrated together with the basket.

The amount of water required for the extraction relative to the amount of the red shiso (dry mass) which has been subjected to the blanching treatment and the water-drainage treatment should be one sufficient for completely immersing, in water, the leaves of the red shiso, which have been water-drained (in this connection, if preparing a calibration curve relating to the correlation between the mass of the water-drained red shiso and the dry mass thereof, the dry mass of the red shiso can be easily determined on the basis of the mass of the water-drained red shiso). For instance, it is suitable that the ratio of the mass of the water-drained leaves of the red shiso to the mass of the water ranges, for instance, from about 1:0.7 to about 1:3 and preferably about 1:1 to about 1:3.

It is preferred in the present invention to quickly cool the leaves of the red shiso after the blanching treatment thereof. This treatment may be conducted, for instance, by water-washing the blanched leaves of the red shiso with cold water. In this respect, the water-washing thereof can, if necessary, be carried out using ice water.

The extraction of the leaves of the red shiso with water can be carried out at a temperature ranging, for instance, from 50 to 100° C. and preferably about 60 to about 90° C. In this respect, if the heating temperature is too low, the taste peculiar to the red shiso is liable to be reduced and there would be observed such a tendency that the time required for the extraction is extended.

It is suitable that the extraction time in general ranges from about 15 to about 60 minutes and preferably about 30 to about 60 minutes. In this connection, if the extraction time is too long, there would be observed such a tendency that the taste peculiar to the red shiso is reduced, but the use of such an extraction time is sufficient for the applications in which such a taste peculiar thereto is never required.

Then, an acid is added to the resulting extract of the red shiso. The addition of an acid would make the red color of the resulting extract more brilliant or clear.

Such an acid usable herein may appropriately be selected from a variety of acids used for foods. Specific examples thereof usable herein include citric acid, malic acid, ascorbic acid and acetic acid. Among them, citric acid is particularly preferred since it is an organic acid included in various kinds of foods in a large amount.

The acid to be added to the extract is not restricted, in its content, to any specific one and the acid may be in any shape, for instance, a liquid form or a solid form (in particular, a powdery form). The temperature of the extract when adding an acid thereto is not restricted to any specific one and it may be one used for the extraction of the leaves of the red shiso, while applying heat, or the acid can be incorporated into the extract cooled to around room temperature after the extraction while applying heat.

The acid is suitably added to the extract of the red shiso in an amount, for instance, ranging from 0.1 to 1.5% by mass and preferably 0.2 to 0.8% by mass on the basis of the mass of the extract. In this respect, the use of an acid would be accompanied by the following situations, although they may be dependent upon the kinds of acids used: If the amount thereof is high, the resulting extract increasingly has an acid taste, while if the amount thereof is low, the resulting extract has such a tendency that the acid taste thereof is weakened. However, the amount of the acid to be used may appropriately be adjusted depending on the applications and the consumers' taste.

The resulting extract may, if necessary, be filtered through, for instance, a cloth having a desired mesh size. Thus, clear syrup can be obtained. Various kinds of filtering devices can be used insofar as they can be used for filtering off any precipitates which may possibly be present in the extract.

It is suitable that the pH value of the resulting syrup ranges, for instance, from 2.5 to 5.5 and preferably 3.0 to 4.5. The pH value thereof is in general determined by the added amount of such an acid.

The resulting syrup of the red shiso is suitably stored at a temperature of not higher than room temperature (for instance, not higher than 25° C.) in a darkroom and, in particular, it is suitably stored in its refrigerated or frozen state. The cold-storage thereof is carried out at a temperature, for instance, ranging from about −25 to about −5° C.

The resulting syrup of the red shiso can be used, in safety, as an agent for imparting red color to a variety of materials. It would be believed that the syrup can safely be applied to foods to be colored in red such as ice creams and cocktails among others since the extract is originated from a naturally occurring substance and it is accordingly safe for the human bodies. The extract of the present invention can be used as syrup for coloring a food in red while imparting, thereto, the flavor and taste peculiar to the shiso, depending on its applications.

Saccharides may be incorporated into the syrup, in advance, depending on the consumers' taste or fancy. Such saccharides may be, for instance, a variety of saccharides and specific examples thereof suitably used herein are maltose (malt sugar), sugar, starch syrup (glucose), grape sugar, and lactose.

EXAMPLES

The present invention will hereunder be described in more detail with reference to the following Examples.

In this respect, however, it is a matter of course that the following Examples never limit the scope of the present invention.

Example 1

Preparation of Syrup Starting from Leaves of Red Shiso

Leaves of red shiso (trade name: HOKO) which had been washed with water and subjected to water-drainage were subjected to a blanching treatment at 90° C. for 30 seconds using salt water (having a salt concentration of 5%) in an amount of 5 times the dry mass of the leaves, then they were cooled to 25° C. with water and thereafter they were subjected to a water-drainage to thus give refined leaves of the red shiso.

The resulting leaves of the red shiso, which had thus been subjected to the blanching and water-drainage treatments, were immersed in water in an amount of 1.4 times the amount of the leaves of the red shiso at 90° C. for 30 minutes to thus give an extract of the red shiso.

At this stage, when adding citric acid (powder) to the resulting extract of the red shiso in an amount of 0.6%, the reddish tinge of the extract was significantly improved. Then, the extract was filtered through a cloth having an opening of 200 mesh to thus give syrup having a clear red color. The resulting syrup was stored in a refrigerator whose temperature was set at −5° C.

The resulting extract was inspected for the absorbance value (ABS), which indicates the intensity of the red color thereof and as a result, it was found to be 1.324.

Reference Example 1

Effect of Common Salt Concentration Used in Blanching Treatment

The same procedures used in Example 1 were repeated except that the salt concentration of the salt water used in the blanching treatment was variously changed as specified in the following Table 1 to thus give syrup of the red shiso. The absorbance values observed for the resulting syrup or extracts are summarized in the following Table 1 as a function of the salt concentration used.

TABLE 1

| Sample No. | Common Salt Conc. (%) | Absorbance (ABS) | Sensory Evaluation |
| --- | --- | --- | --- |
| 1 | 0 | 0.653 | The syrup has a slight bitter taste. |
| 2 | 2 | 1.065 | |
| 3 | 5 | 1.769 | |
| 4 | 10 | 1.688 | The syrup has a weak taste peculiar to red shiso. |

As will be seen from the data shown in Table 1, there is observed such a tendency that the higher the salt concentration of the salt water used in the blanching treatment, the stronger the reddish tinge of the resulting syrup.

Reference Example 2

Effect of Temperature Used in Blanching Treatment

The same procedures used in Reference Example 1 were repeated except for using salt water having a salt concentration of 5% to thus give syrup of the red shiso. The absorbance values observed for the resulting syrup or extracts are summarized in the following Table 2 as a function of the temperature used in the blanching treatment.

TABLE 2

| Sample No. | Temperature (° C.) | Absorbance (ABS) | Sensory Evaluation |
| --- | --- | --- | --- |
| 1 | 70 | 0.636 | The syrup has a slightly strong bitter taste. |
| 2 | 80 | 0.904 | The syrup has a slight bitter taste. |
| 3 | 90 | 1.519 | |
| 4 | 100 | 1.525 | |

As will be seen from the data listed in Table 2, there is observed such a tendency that the reddish tinge of the resulting syrup is improved as the blanching temperature used increases.

Reference Example 3

Effect of Amount of Salt Water Used in Blanching Treatment

The same procedures used in Reference Example 1 were repeated except that the ratio of the amount of the leaves of the red shiso to that of the salt water was variously changed as specified in the following Table 3 to thus give syrup of the red shiso. The absorbance values observed for the resulting syrup or extracts are summarized in the following Table 3 as a function of the amount of the salt water used in the blanching treatment.

TABLE 3

| Sample No. | The Ratio of Leaves of red shiso to Water | Absorbance (ABS) | Sensory Evaluation |
| --- | --- | --- | --- |
| 1 | 1:8 | 1.935 | |
| 2 | 1:5 | 1.936 | |
| 3 | 1:3 | 1.939 | |
| 4 | 1:2 | 1.961 | The syrup has a slight bitter taste. |

Reference Example 4

Effect of Amount of Water Used in Extraction Process

The same procedures used in Example 1 were repeated except that in the water-extraction step, the leaves of the red shiso, which had been subjected to the blanching treatment, were immersed in water at a ratio of the amount of the leaves to that of the water used as specified in the following Table 4 to thus give syrup of the red shiso.

The absorbance values observed for the resulting syrup or extracts are summarized in the following Table 4 as a function of the ratio of the amount of the leaves to that of the water, in the extraction step.

TABLE 4

| Sample No. | Wt. Ratio of Leaves of red shiso to Salt Water | Absorbance (ABS) | Sensory Evaluation |
| --- | --- | --- | --- |
| 1 | 1:0.8 | 2.148 | The immersion is insufficient, but the contact between the leaves and the water can be promoted through stirring. |
| 2 | 1:1.4 | 1.478 | |
| 3 | 1:2.0 | 1.076 | |
| 4 | 1:2.6 | 0.866 | The syrup has a weak taste peculiar to the red shiso |

The results listed in Table 4 indicate that the smaller the amount of the water used in the extraction step, the higher the density of the red color of the resulting syrup. In this respect, however, when the amount of water used is small, all of the leaves are not completely dipped in water and therefore, it is necessary to increase the degree of contact between the leaves and the water through stirring. The ratio of the amount of the leaves to that of the water used, which is equal to 1:1.4 (Sample No. 2), corresponds to the lowest acceptable level of the water required for completely dipping the leaves therein. If the amount of the water increases to a level higher than the foregoing ratio of 1:1.4, the leaves can be easily extracted without stirring the extraction system, but it would be believed that the stirring of the extraction system permits the improvement of the extraction efficiency.

Reference Example 5

Influence of Temperature Used in Extraction Step

The same procedures used in Example 1 were repeated except that, in the water-extraction step, the extraction temperature was set at a level as specified in the following Table 5 to thus prepare syrup of the red shiso.

The absorbance values observed for the resulting syrup or extracts are summarized in the following Table 5 as a function of the temperature used in the extraction step.

TABLE 5

| Sample No. | Extraction Temp. (° C.) | Absorbance (ABS) | Sensory Evaluation |
| --- | --- | --- | --- |
| 1 | 60 | 1.001 | The taste peculiar to the red shiso is weak. |
| 2 | 70 | 1.257 | |
| 3 | 80 | 1.436 | |
| 4 | 90 | 1.501 | |

As will be seen from the results listed in Table 5, the reddish tinge of the resulting syrup is liable to increase in proportion to the increase of the extraction temperature used.

Reference Example 6

Influence of Extraction Time Used in Extraction Step

The same procedures used in Example 1 were repeated except that, in the water-extraction step, the extraction time was set at a level detailed in the following Table 6 to thus obtain syrup of the red shiso.

The absorbance values observed for the resulting syrup or extracts are summarized in the following Table 6 as a function of the extraction temperature used in the extraction step.

TABLE 6

| Sample No. | Extraction Time (min) | Absorbance (ABS) | Sensory Evaluation |
| --- | --- | --- | --- |
| 1 | 15 | 1.336 | |
| 2 | 30 | 1.295 | |
| 3 | 45 | 1.284 | |
| 4 | 60 | 1.453 | The syrup has a slight bitter taste. |

The data listed in Table 6 indicates that, with respect to the relation between the extraction time used and the reddish tinge of the resulting syrup, the longer the extraction time, the deeper the color of the syrup.

Reference Example 7

Effect of Kind of Acid Used in Acid-Addition Step

The same procedures used in Example 1 were repeated except for using acids, whose kinds were specified in the following Table 7 in the acid-treating step, to thus obtain syrup of the red shiso.

The absorbance values observed for the resulting syrup or extracts are summarized in the following Table 7 as a function of the kind of the acid used in the acid-addition step.

TABLE 7

| Kind of Acid | Amt. Added | pH | Absorbance (ABS) | Sensory Evaluation |
| --- | --- | --- | --- | --- |
| Acetic acid | 7.5 mL | 4 | 1.131 | The syrup has a slightly strong acid taste. |
| Citric acid | 0.21 g | 4 | 1.324 | |
| Malic acid | 0.22 g | 4 | 1.295 | |
| Ascorbic acid | 0.7 g | 4 | 1.352 | The syrup has a slightly strong acid taste. |

As will be seen from the data listed in Table 7, citric acid is in general preferably used.

Reference Example 8

Effect of Added Amount of Citric Acid

The same procedures used in Example 1 were repeated except for using citric acid in an amount specified in the following Table 8, in the acid-addition step to thus give syrup of the red shiso.

The absorbance values observed for the resulting syrup or extracts are summarized in the following Table 8 as a function of the kind of the acid used in the acid-addition step.

TABLE 8

| Sample No. | Added Amt. (%) | pH | Absorbance (ABS) | Sensory Evaluation |
| --- | --- | --- | --- | --- |
| 1 | 0.2 | 4.35 | 0.678 | The syrup has a slightly weak acid taste. |
| 2 | 0.4 | 3.98 | 1.010 | |
| 3 | 0.6 | 3.77 | 1.324 | |
| 4 | 0.8 | 3.60 | 1.607 | The syrup has a slightly strong acid taste. |

As will be seen from the data listed in Table 8, there is observed such a tendency that the reddish tinge of the resulting syrup is increased as the added amount of citric acid used increases.

Application Example 1

When the red shiso's syrup prepared in Example 1 was used as a topping for ice creams, it was found that the resulting product was quite excellent in the color contrast between the clearness of the topping's red color and the white color of the ice cream.

In addition, when adding, to low-class distilled spirits, the syrup having red color, which still had the flavor and taste of the shiso, the taste and flavor peculiar to the shiso was imparted to the low-class distilled spirits, and this could make the resulting spirits quite tender to the tongue and throat.

Thus, according to the present invention, syrup having a clear red color can be prepared by the use of red shiso as a raw material and by extracting the same while applying heat thereto and subsequently treating the extract with an acid. The red shiso's syrup obtained according to the present invention is originated from a naturally occurring raw food material and accordingly, it never suffers from any problem upon the application to the human body or it is quite safe for the human bodies as compared with the synthetic syrup.

What is claimed is:

1. A method for preparing syrup from red shiso, the method comprising:
    (1) draining water after blanching raw red shiso in a salt water having a salt concentration of 1% to 15% by mass;
    (2) extracting, with water, the blanched red shiso while applying heat; and
    (3) adding an acid to the extract of the red shiso.

2. The method of claim 1, wherein the red shiso comprises a leaf of red shiso.

3. The method of claim 1, further comprising:
    (4) filtering the extract of the red shiso, after the adding (3).

4. The method of claim 3, further comprising:
    incorporating a saccharide into the extract of the red shiso, after the filtering (4).

5. The method of claim 1, wherein the acid employed in the adding (3) is a member selected from the group consisting of citric acid, malic acid, ascorbic acid, and acetic acid.

6. The method of claim 5, wherein the acid is citric acid.

7. The method of claim 1, wherein the red shiso consists essentially of leaves of red shiso.

8. The method of claim 1, wherein the salt water in (1) has a salt concentration of 1 to 10%.

9. The method of claim 1, wherein the salt water in (1) has a salt concentration of about 2 to about 7%.

10. The method of claim 1, wherein a ratio by mass of the red shiso, in dry mass, to the salt water, in the blanching in (1), is 1:2 to 1:10.

11. The method of claim 10, wherein the ratio is 1:3 to 1:9.

12. The method of claim 1, wherein the blanching in (1) is carried out at a temperature in a range of from 60 to 100° C.

13. The method of claim 1, wherein the blanching in (1) is carried out at a temperature in a range of from 90 to 100° C.

14. The method of claim 1, wherein the blanching in (1) is carried out for from 10 seconds to 2 minutes.

15. The method of claim 1, wherein the blanching in (1) is carried out for from 20 to 50 seconds.

16. The method of claim 1, wherein a ratio of a mass of the red shiso, as a dry mass, to the water in the extracting (2) is 1:0.7 to about 1:3.

17. The method of claim 16, wherein the ratio about 1:1 to about 1:3.

18. The method of claim 1, wherein the extracting (2) is carried out at a temperature in a range of from 50 to 100° C.

19. The method of claim 1, wherein the extracting (2) is carried out at a temperature in a range of from about 60 to about 90° C.

20. The method of claim 1, wherein the extracting (2) is carried out for about 15 to about 60 minutes.

* * * * *